US 9,065,589 B2

(12) United States Patent
Ghiggino et al.

(10) Patent No.: US 9,065,589 B2
(45) Date of Patent: Jun. 23, 2015

(54) APPARATUS AND METHOD FOR OPERATING A WAVELENGTH DIVISION MULTIPLEXING ACCESS NETWORK

(75) Inventors: Pierpaolo Ghiggino, Leamington Spa (GB); Alberto Bianchi, Marina di Pisa (IT); Fabio Cavaliere, Vecchiano (Pisa) (IT); Antony Thorley, Coventry (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 13/388,151

(22) PCT Filed: Jul. 31, 2009

(86) PCT No.: PCT/EP2009/059932
§ 371 (c)(1),
(2), (4) Date: Apr. 6, 2012

(87) PCT Pub. No.: WO2011/012167
PCT Pub. Date: Feb. 3, 2011

(65) Prior Publication Data
US 2012/0189301 A1    Jul. 26, 2012

(51) Int. Cl.
*H04B 10/08* (2006.01)
*H04B 17/00* (2006.01)
*H04J 14/00* (2006.01)
*H04J 14/02* (2006.01)
*H04J 4/00* (2006.01)

(52) U.S. Cl.
CPC ......... *H04J 14/0282* (2013.01); *H04J 14/0227* (2013.01); *H04J 14/0257* (2013.01); *H04J 14/026* (2013.01)

(58) Field of Classification Search
USPC ......... 398/34, 33, 25, 68, 78, 79, 95
See application file for complete search history.

(56) References Cited

U.S. PATENT DOCUMENTS

| 6,798,781 | B1 * | 9/2004 | Hill | 370/398 |
| 7,292,784 | B2 * | 11/2007 | Lee et al. | 398/49 |
| 7,672,586 | B2 * | 3/2010 | Martin | 398/49 |
| 8,265,432 | B2 * | 9/2012 | Doany et al. | 385/14 |
| 8,391,715 | B2 * | 3/2013 | Niibe et al. | 398/71 |

(Continued)

FOREIGN PATENT DOCUMENTS

| EP | 1978653 | 10/2008 |
| JP | H10-257029 | 9/1998 |

(Continued)

OTHER PUBLICATIONS

English Translation of Japanese Office Action mailed Jun. 3, 2013 in Japanese Application No. 2012-521978.

(Continued)

*Primary Examiner* — David Payne
*Assistant Examiner* — Pranesh Barua
(74) *Attorney, Agent, or Firm* — Nixon & Vanderhye P.C.

(57) ABSTRACT

The invention relates in general to a method, an apparatus and a unit for operating a Wavelength Division Multiplexing Access Network 25, and in particular to unbundling wavelengths in the network 25. Embodiments of the invention disclose monitoring a plurality of wavelengths of the Wavelength Division Multiplexing Access Network 25 to determine at least one available wavelength that is free for use. The transmitter then automatically transmits data to at least one user device 22 via at least one available wavelength.

29 Claims, 5 Drawing Sheets

(56) References Cited

U.S. PATENT DOCUMENTS

| | | | |
|---|---|---|---|
| 2004/0013425 A1* | 1/2004 | Lohr et al. | 398/34 |
| 2004/0101302 A1* | 5/2004 | Kim et al. | 398/45 |
| 2004/0223762 A1* | 11/2004 | Lee et al. | 398/51 |
| 2005/0053328 A1* | 3/2005 | Doerr | 385/27 |
| 2005/0074238 A1* | 4/2005 | Sung et al. | 398/58 |
| 2005/0175344 A1* | 8/2005 | Huang et al. | 398/79 |
| 2006/0269282 A1* | 11/2006 | Gerstel | 398/19 |
| 2007/0092256 A1* | 4/2007 | Nozue et al. | 398/72 |
| 2007/0154217 A1* | 7/2007 | Kim et al. | 398/72 |
| 2008/0019693 A1* | 1/2008 | Sorin | 398/71 |
| 2008/0138072 A1* | 6/2008 | Sakamoto et al. | 398/68 |
| 2009/0016726 A1 | 1/2009 | Suzuki et al. | |
| 2009/0232494 A1* | 9/2009 | Hehmann et al. | 398/25 |
| 2009/0297151 A1* | 12/2009 | Yoneda et al. | 398/79 |
| 2010/0020690 A1* | 1/2010 | Komiya et al. | 370/235 |
| 2010/0239251 A1* | 9/2010 | Biegert et al. | 398/58 |
| 2012/0230689 A1* | 9/2012 | Baldini et al. | 398/48 |

FOREIGN PATENT DOCUMENTS

| | | |
|---|---|---|
| JP | 2007-523538 | 8/2007 |
| KR | 20070006767 | 11/2007 |
| WO | WO 2007/086514 | 12/2007 |

OTHER PUBLICATIONS

English Translation of Korean Office Action mailed Jul. 16, 2013 in Korean Application No. 10-2012-7005444.
International Search Report for PCT/EP2009/059932, mailed Apr. 16, 2010.
Summerfield et al., "Collision avoidance in all-optical wavelength-division multiplexed packet networks", *Journal of Lightwave Technology*, vol. 21, No. 11, Nov. 1, 2003, pp. 2652-2660.

\* cited by examiner

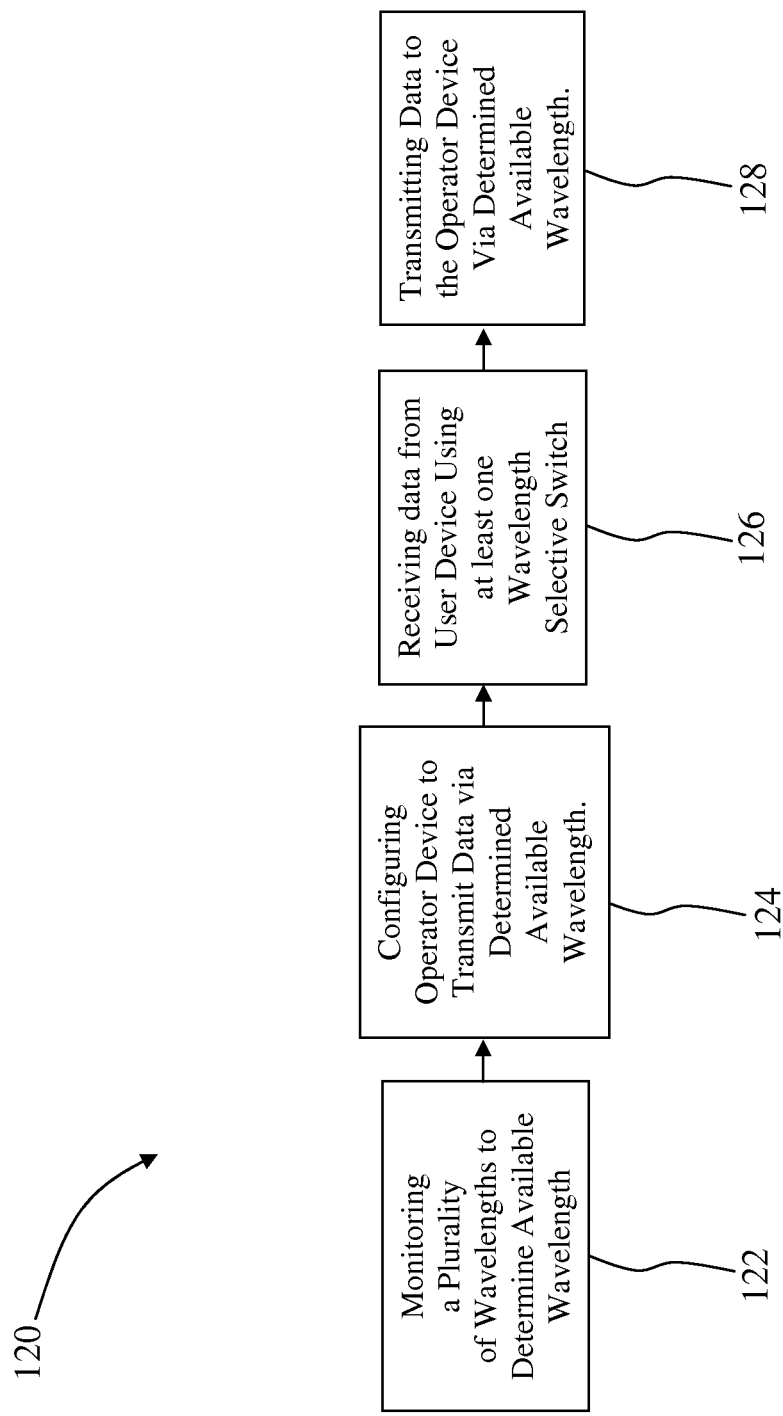

APPARATUS AND METHOD FOR OPERATING A WAVELENGTH DIVISION MULTIPLEXING ACCESS NETWORK

This application is the U.S. national phase of International Application No. PCT/EP2009/059932 filed 31 Jul. 2009 which designated the U.S., the entire content of which is hereby incorporated by reference.

TECHNICAL FIELD

The invention relates to a method, an apparatus and a unit for operating a Wavelength Division Multiplexing Access Network, and in particular to unbundling wavelengths in a Wavelength Division Multiplexing Access Network.

BACKGROUND

Communications operators are continuing to develop multiple play services which may include the provisioning of Internet access, television/video, and telephone services via a single broadband connection. Communications traffic at network edges is generally increasing over time due to the rising demand for such services by business and residential customers. This rising demand places an increasing requirement on the necessary bandwidth to deliver those services.

Access networks and infrastructures are also required to evolve over time to allow for such an increasing bandwidth need, and to deliver services at a lower cost per bit than the current cost. Future scalability of networks is also an important factor when designing new network infrastructures because the number of users and individual bandwidth requirements generally increases over time. Furthermore, the number of users changing their communications service provider also generally increases over time. The current trend in communications network design is to deploy optical fibre closer to the user, know as Fiber-To-The-Home or Business, via long reach networks such as Gigabit-capable Passive Optical Networks (GPONs).

It is also known to use a Wavelength Division Multiplexing Passive Optical Network (WDM-PON) to provide users with communications services. Performing WDM allows multiple different wavelengths carrying data to be transmitted via a single optical fibre. A typical WDM-PON comprises an Optical Line Terminal (OLT) at a central office premises, an optical wavelength splitter near the central office premises, and a series of Optical Network Units (ONUs) or Optical Network Terminals (ONTs) near the end users. Such a WDM-PON is considered to be passive because the optical transmission has no power requirements once an optical signal is travelling through the network section connecting the ONT or ONU to the OLT.

It is desirable to unbundle wavelengths with the known WDM-PONs to allow multiple communication service providers to provide communications services to different users over the same network infrastructure. Typically such unbundling is achieved by a telecommunications engineer visiting the OLT at the central office premises to physically reconfigure the OLT. Such physical reconfiguring can only be performed once the different operators have agreed in advance which wavelengths they should use. Unbundling is thought to be an important concept because it drives the growth of communications services and allows the communications network to grow and develop over time. Furthermore, unbundling is often a regulatory requirement to improve competition in the supply of communications service.

A communications network such as a WDM-PON can be expensive to install and maintain. Providing for the future scalability of the network may also be expensive particularly where additional optical fibre is required to be deployed in an urban environment. A significant driver in the design of future networks is to allow for future scalability at an appropriate cost whilst maintaining simplicity of use and deployment.

SUMMARY

It is desirable to provide a way of readily allowing service providers to make communications services available to any user, and to reduce at least some of the above-mentioned problems.

According to a first aspect of the invention, there is provided a method of operating a wavelength division multiplexing access network. The method comprises monitoring a plurality of wavelengths of the wavelength division multiplexing access network to determine at least one available wavelength that is free for use. The method includes configuring at least one operator device to transmit data to at least one user device via at least one of said determined at least one available wavelength.

Such a way of operating a wavelength division multiplexing access network has the advantage that service providers can readily provide communications services to particular user devices. This advantage is provided by monitoring of the wavelengths and determining which wavelength is available for making services available to a particular user device. Furthermore, the method allows each service provider to use the same optical fibre infrastructure.

Such ready unbundling of wavelengths avoids the requirement for a communications engineer to visit a central office premises to reconfigure the network. This may provide the additional benefits of reducing operational expenditure of the network and reducing complexity in the unbundling process. Further advantages in performing such ready unbundling are provided by allowing the network to grow and evolve over time which provides an improved scalability of the network at an appropriate cost.

Said monitoring may comprise determining at least two available wavelengths that are free for use, and said configuring includes configuring at least one other operator device to transmit data to at least one user device via a different wavelength of said determined available wavelengths. It will be appreciated that the at least one user device may be the same user device or a different user device. Such a method allows for improved flexibility so that a different service provider can provide communications services via one or more available wavelengths from the different operator device.

Said configuring may comprise tuning a transmitter wavelength of said operator device to said at least one determined available wavelength.

Said monitoring may comprise monitoring at least one wavelength at a coupling device to determine at least one available wavelength.

Preferably the coupling device is an optical coupler and said monitoring may include monitoring the plurality of wavelengths at an output port of the optical coupler to determine at least one available wavelength. Using a coupling device such as an optical coupler may provide a convenient way to monitor the available wavelength or wavelengths.

The method may comprise receiving data from the at least one user device using at least one wavelength selective switch and transmitting the data to at least one operator device via said at least one of said determined one available wavelength.

Such an arrangement may provide the further advantage of improved confidentiality for data transmitted from the at least one user device.

Said monitoring may comprise monitoring a power of at least one wavelength to determine whether said wavelength is available.

Said monitoring may comprise monitoring said plurality of wavelengths at each operator device, the method comprising the operator devices agreeing which operator device is to transmit data via said at least one determined available wavelength, prior to said configuring. It will be appreciated that such a way of monitoring may use a communication between the operator devices, or between the service providers in the provisioning of communication services to the at least one user device.

Said monitoring may comprise determining a plurality of available wavelengths that are free for use.

Said configuring comprises configuring said at least one operator device to transmit data to said at least one user device via a subset of said determined plurality of available wavelengths. The subset may be two or more wavelengths. The subset may be less than 100% of the available wavelengths, or all of the available wavelengths.

According to a second aspect of the invention there is provided an apparatus for a wavelength division multiplexing access network. The apparatus comprises at least one operator device comprising a transmitter for transmitting data to at least one user device via at least one wavelength of the wavelength division multiplexing access network. The apparatus comprises a monitoring device to monitor a plurality of wavelengths of the wavelength division multiplexing access network to determine at least one available wavelength that is free for use. The apparatus further comprises a controller arranged to configure the transmitter to transmit data to the at least one user device via at least one of said determined at least one available wavelength.

Such an apparatus provides the advantage that service providers can readily provide communications services to particular user devices via the at least one operator device, by the monitoring device monitoring the wavelengths to determine an available wavelength to make services available to a particular user device. The apparatus then automatically transmits on an available wavelength. This type of apparatus also allows each service provider to use the same optical fibre infrastructure.

Such ready unbundling of wavelengths avoids the requirement for a communications engineer to visit a central office premises to reconfigure the network. This may provide the additional benefits of reducing operational expenditure of the network and reducing complexity in the unbundling process.

The monitoring device may be arranged to determine at least two available wavelengths that are free for use. The controller may be arranged to configure at least one other operator device to transmit data to at It will be appreciated that the at least one user device may be the same user device or a different user device. Such an apparatus allows for an improved operational flexibility such that a different service provider can provide communications services via one or more wavelengths from the different operator device.

The transmitter may be a tuneable transmitter, such as a tuneable laser. The controller may be arranged to configure the transmitter by tuning a wavelength of the transmitter to said at least one determined available wavelength.

The monitoring device may be arranged to monitor at least one wavelength at a coupling device to determine said at least one available wavelength.

Preferably the coupling device is an optical coupler having at least one output port, and the monitoring device is arranged to monitor at least one wavelength via the at least one output port. Utilising a coupling device such as an optical coupler may provide a convenient way to monitor the available wavelength or wavelengths.

The apparatus may comprise at least one wavelength selective switch for receiving data from the at least one user device, the controller being arranged to configure the wavelength selective switch to transmit the data to said operator device via said at least one determined available wavelength. Such an arrangement may provide the further advantage of improved confidentiality for data transmitted from the at least one user device.

The monitoring device may comprise a power monitoring unit. Each operator device may comprise a respective one of said monitoring device. Such a way of monitoring may require a reduced level of communication between the service providers provisioning communication services to the user devices.

The monitoring device may be further arranged to determine a plurality of available wavelengths that are free for use.

The monitoring device may be arranged to determine a plurality of available wavelengths that are free for use.

The controller may be arranged to configure at least one operator device to transmit data to the at least one user device via a subset of said determined plurality of available wavelengths.

According to a third aspect of the invention there is provided a unit for a wavelength division multiplexing access network. The unit comprises a controller having an input for receiving an information signal indicative of at least one available wavelength of the wavelength division multiplexing access network that is free for use. The unit comprises at least one transmitter to transmit data via at least one wavelength of the wavelength division multiplexing access network. The controller is arranged to control the transmitter to transmit data at said at least one available wavelength in response to the information signal.

A unit may further comprise a monitoring device to monitor a plurality of wavelengths of the wavelength division multiplexing access network to determine the at least one available wavelength, and to generate said information signal.

The transmitter may be optically integrated as a complementary metal oxide semiconductor integrated circuit. The controller may be a processor, such as a microprocessor.

In one arrangement the unit is operable for use in the apparatus of the second aspect of the invention.

According to a fourth aspect of the invention there is provided a communications network using a method of the first aspect of the invention, or including apparatus of the second aspect of the invention, or including a unit of the third aspect of the invention.

According to a fifth aspect of the invention there is provided a computer program product operable to perform a method of the first aspect of the invention, or operable to control apparatus of the second aspect of the invention, or operable to control a unit of the third aspect of the invention.

BRIEF DESCRIPTION OF THE DRAWINGS

Other features of the invention will be apparent from the following description of preferred embodiments shown by way of example only with reference to the accompanying drawings, in which;

FIG. 5 shows a flow diagram illustrating a method according to an embodiment of the invention.

DETAILED DESCRIPTION

Figure 1:
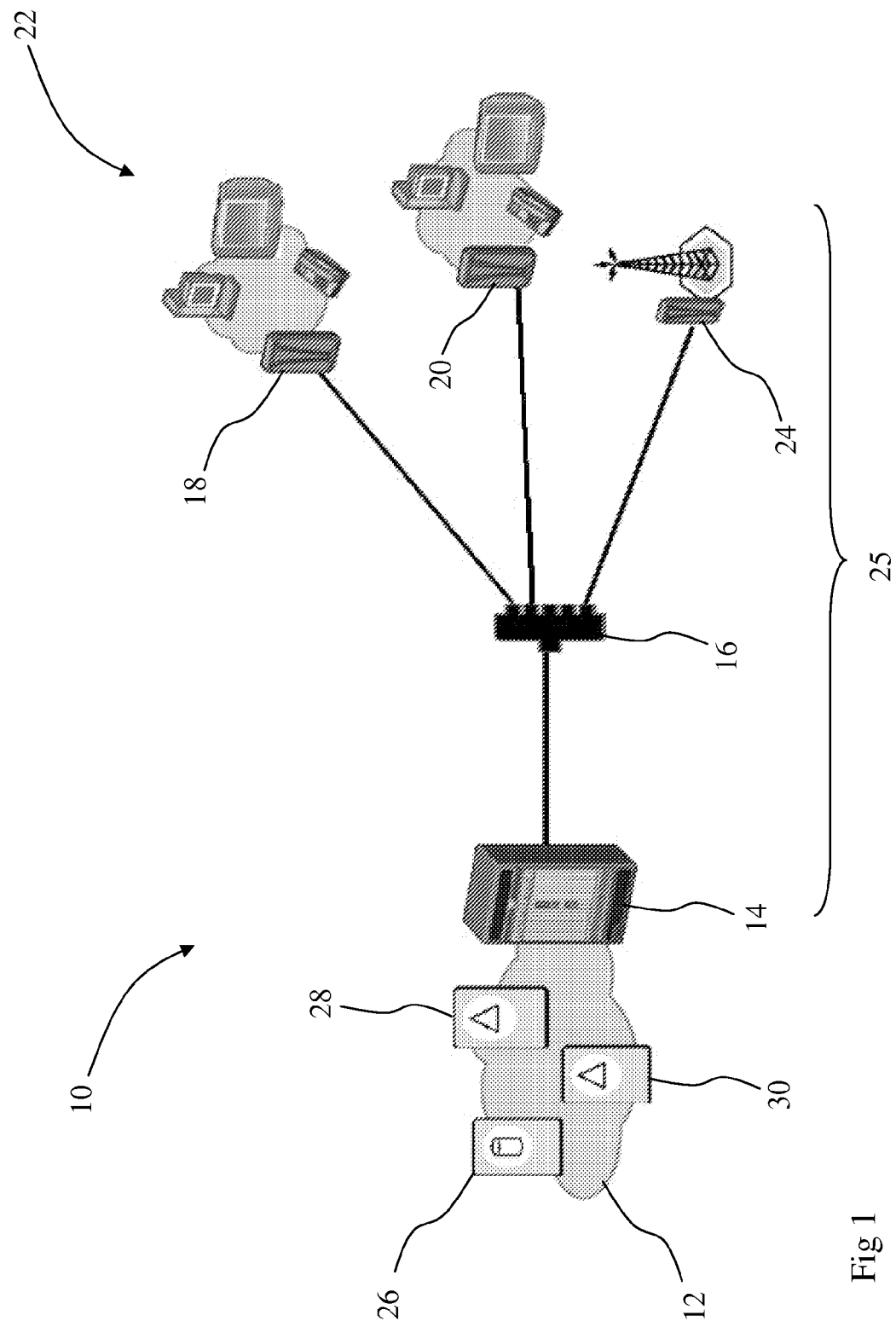
FIG. 1 shows a diagram of a communications network to describe embodiments of the invention.

FIG. 1 shows a diagram of a communications network used as a reference to describe embodiments of the invention, generally designated 10. In FIG. 1 the communications network 10 comprises a core network 12 having an Optical Line Terminal (OLT) 14 at a Central Office premises. The OLT 14 is in communication with a passive optical wavelength splitter 16. The passive optical wavelength splitter 16 is in communication with one or more Optical Network Terminals (ONT) 18, 20 at a user premises to provide communication services to user devices generally labelled 22. The passive optical wavelength splitter 16 may also be in communication with a Base Transceiver Station (BTS) 24 of a mobile network to provide mobile communication services to the user devices 22. These communication services may be high-speed Internet access, television/video, and/or telephone services provided via the OLT 14 which is in communication with an application server 26, a multimedia server 28, and a telephony server 30 in the core network 12. The link between the OLT 14 and the passive optical wavelength splitter 16, and the links between the passive optical wavelength splitter 16 and the ONTs 18, 20 or the BTS 24 are optical fibres, such that there may be many paths within the same link. Together the OLT 14, the passive optical wavelength splitter 16, the ONTs 18, 20, and the BTS 24 are arranged to form a Wavelength Division Multiplexing Passive Optical Network (WDM-PON) generally labelled 25, which may alternatively be termed a WDM access network. The OLT 14 may be a node or an apparatus of the communications network 10, which is operable to perform the functions described herein.

In this specification a Passive Optical Network (PON) is defined as being an optical network where there is no optical amplification for transmission of optical signals between the OLT 14 and the ONTs 18, 20, and the BTS 24. In particular the passive optical wavelength splitter 16 divides the bandwidth to serve the multiple user devices 22 without requiring electric power for its operation. Hence there are no active optical components that require power between the OLT 14 at the CO and the ONTs 18, 20, and the BTS 24. However, in the case of implementing the embodiments in a long-reach PON there may be an optical amplifier within the access network to extend the distance over which communications services can be provided to the user devices 22.

Figure 2:
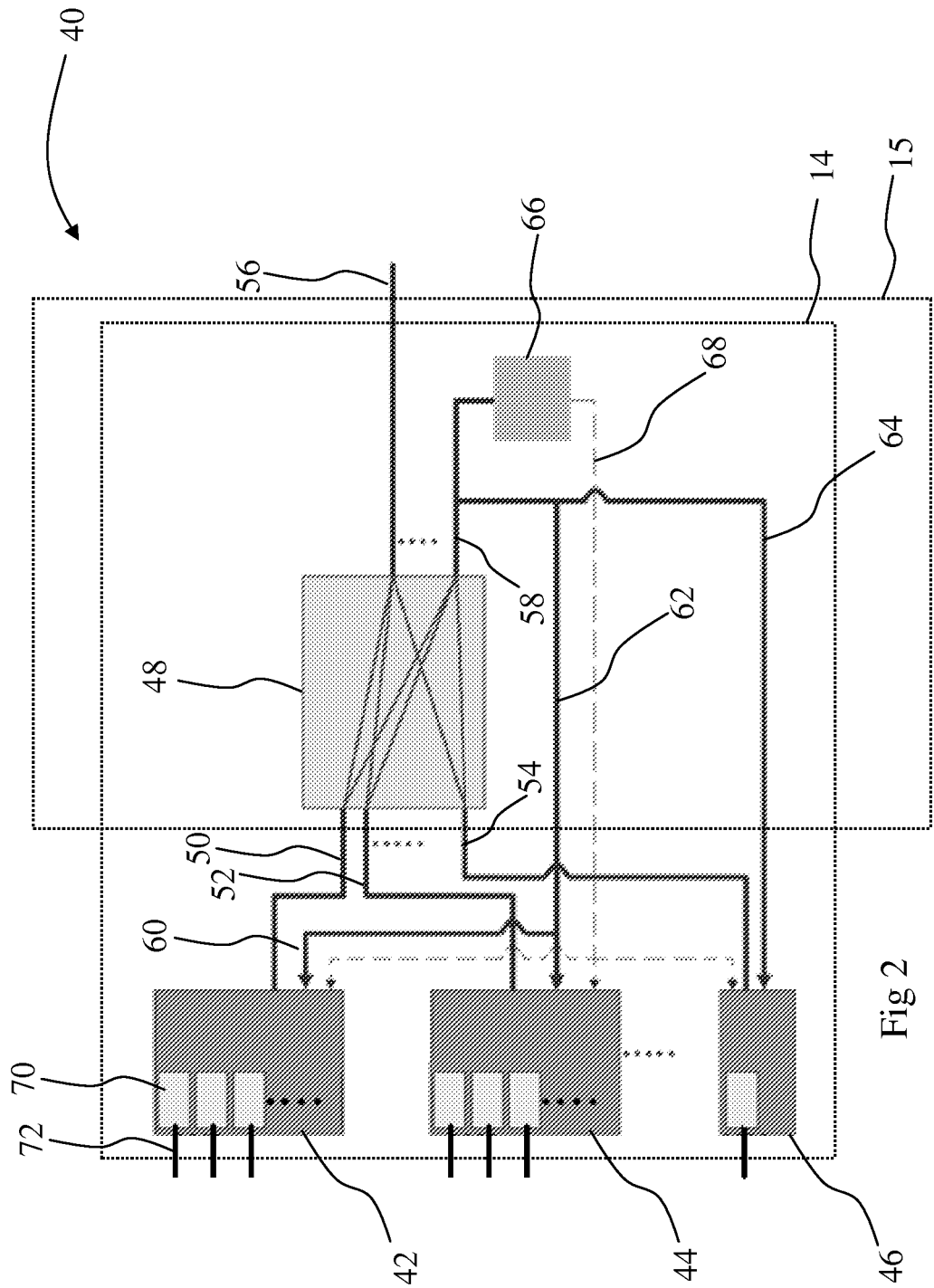
FIG. 2 is a schematic diagram showing the arrangements in the Optical Line Terminal of FIG. 1 according to an embodiment of the invention.

FIG. 2 is a schematic diagram showing the arrangements in the Optical Line Terminal 14 of FIG. 1 according to an embodiment of the invention, generally designated 40. Like features to the arrangements of FIG. 1 are shown with like reference numerals. In FIG. 2 solid lines represent optical connections and dashed lines represent electrical connections. The OLT, outlined by dotted box 14, comprises a plurality of operator devices 42, 44, 46 which are in communication with respective inputs of a coupling device via optical connections 50, 52, 54. The coupling device is an optical coupler 48 which has an output 56 in communication with the passive optical wavelength splitter 16 of FIG. 1. In FIG. 2 the optical coupler 48 also has respective outputs 58 which are optically connected to each operator device 42, 44, 46 via optical connections 60, 62, 64 to provide optical monitoring for each operator device 42, 44, 46 so that each operator device 42, 44, 46 knows which wavelengths are being used to provide communications services to a particular user device 22 from a particular operator device 42, 44, 46. This allows each operator device 42, 44, 46 to learn the available wavelengths by performing such optical monitoring. It will be appreciated that the optical coupler 48 so described has the configuration (n+1)×(n+1) so that there are an equal number of input and output ports. In the embodiments presented herein typically n=40. One of the input ports of the optical coupler 48 is not used due to the symmetry requirements of the optical coupler 48, and this unused input port is not shown in the diagram. It will be appreciated that different input ports of the optical coupler 48 can be connected to the same operator device 42, 46, 48 as required. In practice each operator device 42, 44, 46 generally uses a fibre pair of the coupling device where one input port of the coupling device is used for transmission and one output port of the coupling device is used for monitoring purposes.

In an alternative arrangement the optical coupler 48 has respective outputs 58 which are connected to respective Power Monitoring Units (PMUs) 66. Only one such PMU is shown in FIG. 2 for the purposes of simplicity. The PMU 66 performs optical spectrum analysis to provide an electrical monitoring function for each operator device 42, 44, 46 via the electrical connections 68. The PMU 66 allows each operator device 42, 44, 46 to know which wavelength is being used to provide communications services to a particular user device 22. If the optical monitoring function is performed by the operator devices 42, 44, 46 the optic fibres 58, 60, 62, 64 are used. If the optical monitoring function is performed by a network infrastructure provider then the optic fibre 58, the PMU 66 and the electrical connections 68 are used. The choice of whether to perform the optical monitoring function by the network infrastructure provider or by the operator devices 42, 44, 46 may depend on certain regulatory requirements.

In FIG. 2 each input of the optical coupler 48 is connected to every output of the optical coupler 48 so that each output carries a combined signal from every operator device 42, 44, 46. In this way the optical coupler 48 operates as a passive optical multiplexer. Each operator device 42, 44, 46 is controlled by a different operator, or communications service provider, and the arrangements of the optical coupler 48 allow any operator device 42, 44, 46 to provide communication services to one or more of the user devices 22 shown in FIG. 1. This arrangement allows a mixed provider network to be more readily achievable.

Figure 4:
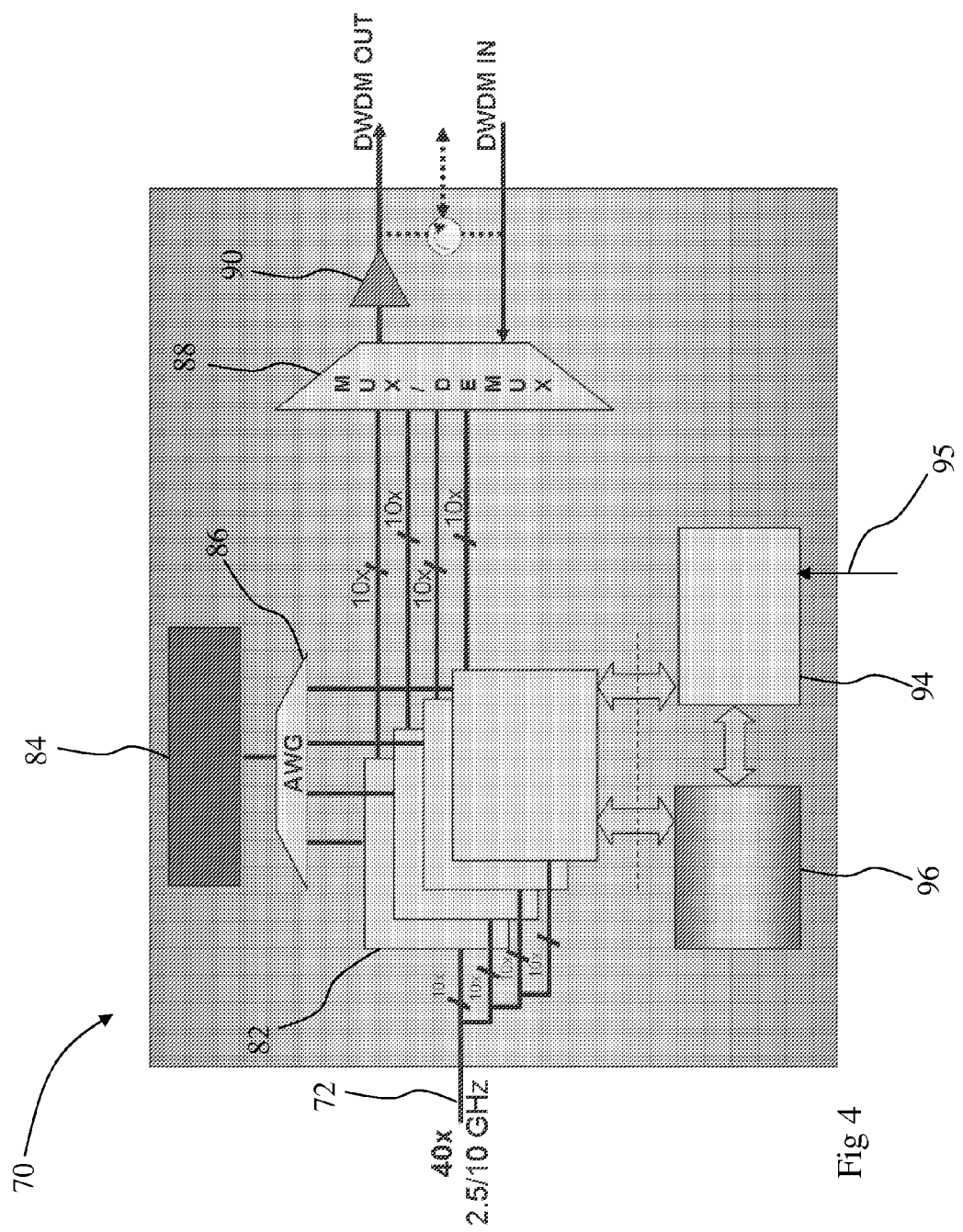
FIG. 4 is a schematic diagram of a channel termination unit shown in FIGS. 2 and 3.

In FIG. 2 each operator device 42, 44, 46 may have up to forty channel termination units 70 which are in communication with the core network 12 via a respective optical link 72. For simplicity only the first operator device 42 is described in detail but each operator device 42, 44, 46 has similar arrangements. In the operator device 42 each channel termination unit 70 can receive forty wavelengths from the core network 12. These forty wavelengths may be 2.5 GHz, 10 GHz, or 40 GHz channels which may operate with different standards such as Gigabit Ethernet (GbE) or Gigabit PON (GPON). Each channel termination unit 70 contains a plurality of photodetectors to decode incoming optical signals, and a multi-wavelength source, such as a bank of lasers, to encode outgoing optical signals as shown in FIG. 4. Each channel termination unit 70 may be an integrated optical module such as an Opto-Electric Integrated Chip (OEIC) in order to provide a sufficiently low cost device. In FIG. 2 the output signals from each channel termination unit 70 are multiplexed together at each operator device 42, 44, 46 before being transmitted to the optical coupler 48 via the optic fibres 50, 52, 54. In this way each operator device 42, 44, 46 can provide communications services to any one of the user devices 22 via a subset of wavelengths following determination of the available wavelengths. A subset may include one or more wavelengths of the available wavelengths. In effect each channel termination unit 70 can selectively activate each wavelength independently to provide communications services to the user devices 22 so that wavelength unbundling is achieved for all of the operator devices 42, 44, 46. It will be appreciated that each operator device 42, 44, 46 contains many channel termination units 70 which contain transponder devices, and each operator device 42, 44, 46 may alternatively be termed a multi transponder unit.

The monitoring information provided by the optic fibres 58, 60, 62, 64, or the optic fibre 58, the PMU 66 and the electrical connections 68, allow each operator device 42, 44, 46 to know which operator device 42, 44, 46 is providing communications services to a particular user device 22. The operators controlling the operator devices 42, 44, 46 are then required to agree which operator device 42, 44, 46 is providing the communications services by selectively turning each wavelength on or off as required in accordance with a suitable regulatory agreement. Turning a particular wavelength on allows a particular operator device 42, 44, 46 to gain access to a particular substructure of the network to provide communication services to a particular user device 22. The monitoring information to check the status of the communication services provided to a particular user device 22 is delivered into the WDM-PON 25 infrastructure and towards the channel termination units 70 of every operator device 42, 44, 46. Accordingly each individual optical wavelength can be turned on or off upon operator agreement allowing access to a particular substructure of the WDM-PON 25.

It will be appreciated that where the optical coupling device is an optical coupler 48 the information flow from the user devices 22 to the core network 12 is detected by all channel termination units 70. In this situation only the wavelength assigned to each operator and the wavelength information content will be transmitted to the core network 12. If the detection by all channel termination units 70 is deemed an unsuitable breach of confidentiality by a Regulator then the optical coupler may be operated as per the arrangements of FIG. 3.

Figure 3:
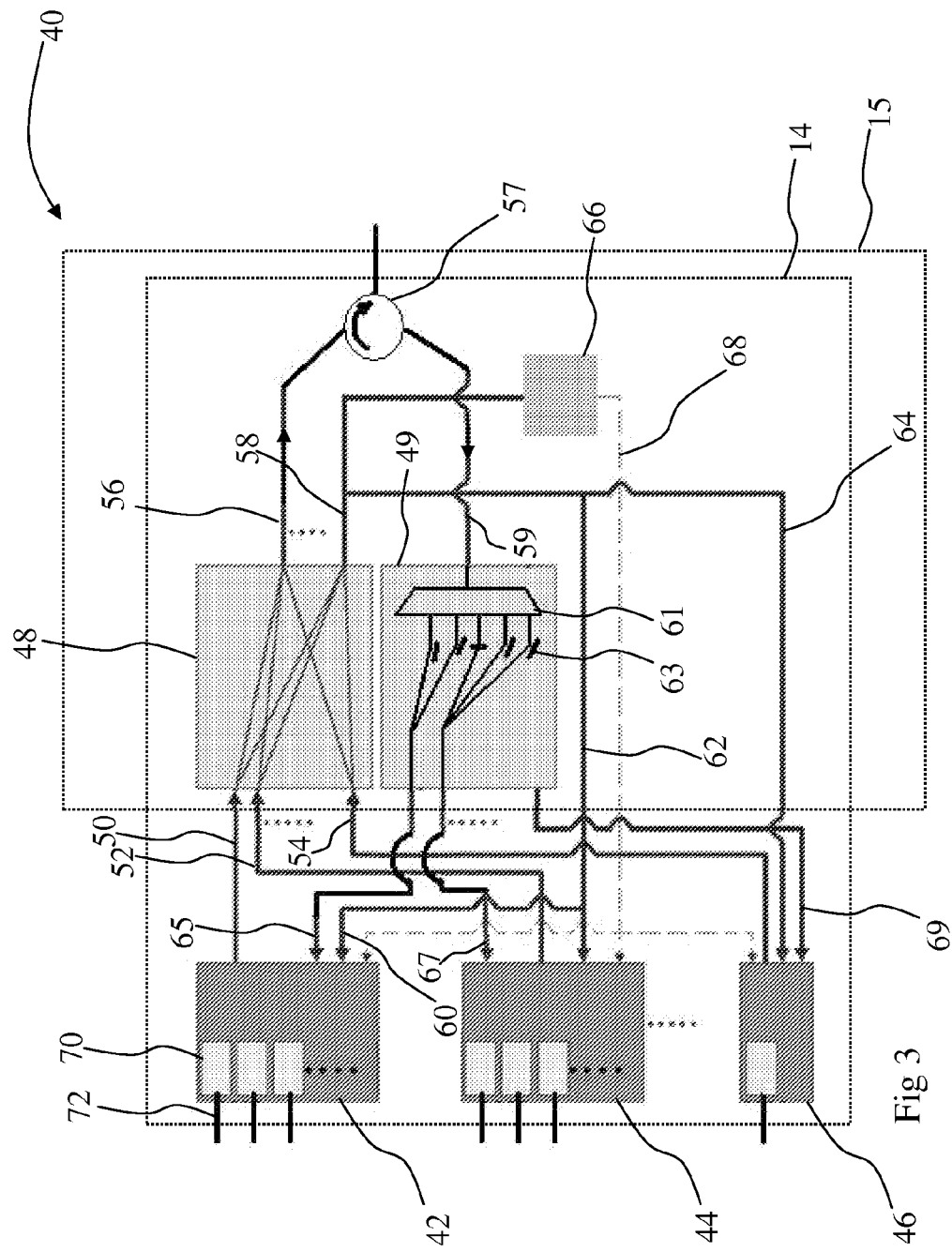
FIG. 3 is a schematic diagram showing the arrangements in the Optical Line Terminal of FIG. 1 according to another embodiment of the invention.

FIG. 3 is a schematic diagram showing the arrangements in the Optical Line Terminal of FIG. 1 according to another embodiment of the invention. Like features to the arrangements of FIG. 2 are shown with like reference numerals. FIG. 3 shows an arrangement whereby the optical coupler 48 is used to transmit data to the user devices 22, and an arrangement of Wavelength Selective Switches (WSSs) 49 is used to receive data from the user devices 22 and transmit it to the operator devices 42, 44, 46. The output 56 is in communication with an optical circulator 57 for transmitting data to the user devices 22. The optical circulator 57 is also operable to receive data from the user devices 22 and pass it to the arrangement of WSSs 49 via input optical fibre 59. The input optical fibre 59 is connected to a demultiplexer 61 which separates the wavelengths from the user devices 22. The demultiplexer 61 then passes the separated wavelengths to an array of mirrors 63 that can be oriented in different positions to direct particular wavelengths to optic fibres 65, 67, 69 in communication with the respective operator devices 42, 44, 46. In the arrangement of WSSs 49 only five wavelengths are shown to be separated and passed to optic fibres 65, 67 for the purposes of simplicity, but it will be appreciated that there may be up to forty or more wavelengths depending on how many wavelengths are present in the WDM signal.

The arrangement of WSSs 49 only allow particular wavelengths to pass to the optic fibres 65, 67, 69 which is configurable by software so that only a subset of wavelengths is transmitted from the input optic fibre 59 to particular operator devices 42, 44, 46. The wavelengths not in the subset are blocked by the arrangement of WSSs 49. In this way the arrangement of WSSs 49 permits data from a user device 22 only to be sent to a particular channel termination unit 70 under the control of a particular operator device 42, 44, 46. Such an arrangement of WSSs 49 increases the cost of operating the OLT 14 and increases the handover complexity when switching from one operator to another operator, but has the advantage of providing improved confidentiality and security for the data from the user devices 22. The arrangement of WSSs 49 provide for a fully regulated WDM-PON 25.

FIGS. 2 and 3 also show an alternative arrangement whereby the operator devices 42, 44, 46 are external to the OLT shown at 15. In this arrangement the operator devices 42, 44, 46 may be remote from the OLT 15 and may be located elsewhere in the core network 12. Each of the channel termination units 70 shown in FIGS. 2 and 3 may be connected together in a daisy chain arrangement whereby each channel termination unit 70 is connected in series to the next channel termination unit 70.

FIG. 4 is a schematic diagram of the channel termination unit 70 shown in FIGS. 2 and 3. In FIG. 4 the channel termination unit 70 has four Opto-Electric Integrated Chips (OEICs) 82 which are in communication with the optical link 72. The optical link 72 may carry up to forty wavelengths which are separated, for example by a demultiplexer, so that each of the four OEICs 82 are arranged to operate with ten wavelengths. Each of the OEICs 82 is coupled to a multi-wavelength source 84 via an Array Waveguide Grating (AWG) 86 to supply each of the four OEICs 82 with the required wavelengths for operation. The four OEICs 82 are in communication with a multiplexer/demultiplexer 88 which operates to multiplex signals for transmission to the user devices 22, and demultiplex signals received from the user devices 22. Each OEIC 82 operates to modulate one or more wavelengths from the multi-wavelength source 84 to modulate and transmit data to the user devices 22. As such each OEIC 82 operates as a transmitter. An optical amplifier 90 may be provided to amplify the optical signal transmitted to the user devices 22. The channel termination unit 70 also has a microprocessor unit 94 and an electrical processing unit 96 which are in communication with the four OEICs 82. The microprocessor unit 94 and the electrical processing unit 96 are operable to decode optical signals that are received by each OEIC 82, and to modulate the multi-wavelength source 84 to encode optical signals transmitted by each OEIC 82. This is achieved by firstly converting optical signals received by each OEIC 82 into electrical signals using an array of photodetectors. The photodetectors are in communication with the microprocessor unit 94 and electrical processing unit 96 to decode the electrical signals. The microprocessor unit 94 and electrical processing unit 96 then operate an array of optical modulators to modulate the multi-wavelength source 84 to output an encoded optical signal to the multiplexer/demultiplexer 88 to transmit data to the user devices 22 via the optical coupler 48. In the reverse direction data is received at the OEIC 82 from the user devices 22 via the multiplexer/demultiplexer 88 and via the optical coupler 48 or the WSS arrangement 49. It will be appreciated that the electrical processing unit 96 may be arranged within the microprocessor unit 94 so that the microprocessor unit 94 performs general processing functions and decoding functions. The channel termination unit 70 is configurable to transmit and receive data via any of the forty wavelengths under control of the microprocessor unit 94 (e.g. controlled by a control signal from the processor 94). The processor 94 receives an information signal 95 to indicate which wavelengths are to be used. The information signal 95 is received from the PMU 66 shown in FIG. 3. The arrangements for receiving data from the user devices 22 are similar to the arrangements for receiving data from the core network 12. It is envisaged that the OEIC 82 is embedded on a single Complementary Metal-Oxide Semiconductor (CMOS) integrated circuit which may provide the required level of component integration and cost reduction.

FIG. 5 shows a flow diagram illustrating a method according to an embodiment of the present invention, generally designated 120. The method relates to the operation of the wavelength division multiplexing passive optical network 25 shown in FIG. 1 with reference to FIGS. 2-4. In FIG. 5 the method includes monitoring a plurality of wavelengths of the wavelength division multiplexing access network 25 to determine at least one available wavelength that is free for use as shown at 122. The method includes configuring at least one operator device 42, 44, 46 to transmit data to at least one user device 22 via at least one of said determined at least one available wavelength as shown at 124.

The monitoring may include determining at least two available wavelengths that are free for use, and said configuring may include configuring at least one other operator device 42, 44, 46 to transmit data to at least one user device 22 via a different wavelength of said determined available wavelengths.

Said configuring may include tuning a transmitter wavelength of said at least one operator device to at least one of said determined at least one available wavelength.

The monitoring may comprise monitoring at least one wavelength at a coupling device 48 to determine at least one available wavelength. The coupling device may be an optical coupler 48, and said monitoring may include monitoring the plurality of wavelengths at an output port of the optical coupler 48 to determine at least one available wavelength.

The method may further include receiving data from the at least one user device 22 using at least one wavelength selective switch 49 and transmitting 128 the data to the at least one operator device 42, 44, 46 via at least one of said determined at least one available wavelength, as shown at 126.

The monitoring may include monitoring a power of at least one wavelength to determine at least one available wavelength. The monitoring may include monitoring at least one wavelength at each operator device 42, 44, 46 to determine at least one available wavelength.

Said monitoring 122 may include monitoring said plurality of wavelengths at each operator device, the method further including each operator device agreeing which operator device is to transmit data via said at least one of said determined at least one available wavelength prior to said configuring 124.

The monitoring may include determining a plurality of available wavelengths that are free for use. The configuring 124 may include configuring at least one operator device 42, 44, 46 to transmit data to the at least one user device 22 via a subset of said determined plurality of available wavelengths.

It will be appreciated that the embodiments of the invention described above allow each operator device 42, 44, 46 to provide communications services to the user devices 22 via a different subset of wavelengths of the WDM-PON 25. Each operator device 42, 44, 46 can monitor the wavelengths of the WDM-PON 25 that are free and not being used by other operator devices 42, 44, 46. Each operator device 42, 44, 46 can then provide communications services to particular user devices 22 via a subset of the wavelengths that are free and not being used by other operator devices 42, 44, 46. Since the monitoring of the available wavelengths is performed by each operator device 42, 44, 46 this has the advantage that minimal communication is required between operator devices 42, 44, 46 when providing communication services to a particular user device 22.

A WDM-PON so described integrates the transport and access networks more effectively and may have a longer reach of up to 80-100 km allowing optic fibre to be brought closer to the user devices 22. The different operator devices 42, 44, 46 allow different protocols, services and networks to co-exist on the same fibres using different wavelengths of the WDM-PON. These advantages allow different operators to provide communications services to selected user devices 22 in a cost effective manner and allows for greatly reduced capital expenditure and operational expenditure for the overall communications network 10. It will be appreciated that the above description with references to the Figures allows for a tuneable ONT 18, 20 whereby each user device 22 can tune into the required wavelength provided by a particular operator without the need for a tuneable filter.

The optic fibre infrastructure for the network 10 is initially expensive and disruptive to deploy especially in densely populated urban areas. The embodiments of the invention described above allow for an improved long term profitability of the overall network 10 because new fibres may not need to be deployed to permit different operators to provide communications services to different user devices 22. In particular, the arrangements of the OLTs 14, 15 shown in FIGS. 2 and 3 allow the WDM-PON to be scalable over time so that the network can evolve as increasing bandwidth is required. The overall cost of scalability is improved which helps to protect the large investment in initial optic fibre deployment. Furthermore the network 10 has an improved operational simplicity because the operators need only to agree between themselves who will provide communications services to a particular user device 22 instead of requiring physical intervention by a communications engineer at the OLTs 14, 15 who would otherwise need to manually reconfigure a change of operator. In the case of individual coupling of user devices 22 to individual wavelengths, the embodiments of the invention described above resolve at least some of the problems associated with unbundling. In the case where more than one user device 22 shares a particular wavelength, the embodiments of the invention described above may provide less complex unbundling depending on the protocol used.

It will be appreciated that the embodiments of the invention relate to a straight forward physical unbundling of wavelengths at level 1 of the Open Systems Interconnection (OSI) Model. This is in contrast to other forms of unbundling in the prior art which may operate at layer 2 or 3 of the OSI Model requiring complex arrangements for successful operation. The embodiments describe an intercept point for wavelength unbundling at the OLTs 14, 15 which permits a simple and cost effective way to open wavelengths to different operators. In turn this provides another advantage in terms of software management of the WDM-PON, which provides a reduction in operational expenditure costs through a simple management interface to enable different operators to gain access to selected user devices 22.

It will be appreciated that whereas the embodiments of the invention have been described with reference to a WDM-PON they may be equally applicable to a Dense WDM-PON or a Coarse WDM-PON or to a general WDM access network.

The invention claimed is:

1. A method of operating a wavelength division multiplexing access network, the method comprising:
   optically monitoring a plurality of wavelengths of the wavelength division multiplexing access network to determine at least one available wavelength that is free for use; and
   configuring at least one of the operator devices to transmit data to at least one user device via at least one of said the determined at least one available wavelength,
   wherein the monitored wavelengths relate to a plurality of operator devices,
   wherein the available wavelength is a wavelength that is not in use by any of the plurality of operator devices, and
   wherein each of the plurality of operator devices
      provides a plurality of the wavelengths,
      monitors available wavelengths independently of the others of the plurality of other operator devices, and
      is associated with a different communication service provider or operator.

2. A method according to claim 1,
   wherein the monitoring comprises determining at least two available wavelengths that are free for use, and
   wherein the configuring includes configuring at least one other operator device to transmit data to at least one user device via a different wavelength of the determined available wavelengths.

3. A method according to claim 1, wherein the configuring comprises tuning a transmitter wavelength of the operator device to the at least one determined available wavelength.

4. A method according to claim 1, wherein the monitoring comprises monitoring at least one wavelength at a coupling device to determine the at least one available wavelength.

5. A method according to claim 1, further comprising:
   receiving data from the at least one user device using at least one wavelength selective switch, and
   transmitting the data to at least one operator device via at least one of the determined available wavelength.

6. A method according to claim 1, wherein the monitoring comprises monitoring a power of at least one wavelength to determine whether that wavelength is available.

7. A method according to claim 1,
   wherein the monitoring comprises monitoring the plurality of wavelengths at each operator device,
   the method further comprising the operator devices agreeing which operator device is to transmit data via the at least one determined available wavelength, prior to the configuring.

8. A method according to claim 1, wherein the monitoring comprises determining a plurality of available wavelengths that are free for use.

9. A method according to claim 8, wherein the configuring comprises configuring the at least one operator device to transmit data to at least one user device via a subset of the determined plurality of available wavelengths.

10. A communications network using a method according to claim 1.

11. A non-transitory, computer program product that stores instructions which when executed by a computer cause a method according to claim 1 to be performed.

12. A method according to claim 1,
   wherein the at least one operator device optically receives service data from a service provider associated with the at least one operator, and
   wherein the configuring comprises configuring the at least one operator device to modulate the determined least one available wavelength with the service data.

13. A method according to claim 1, wherein the configuring comprises configuring the at least one operator device to concurrently transmit data to at least two user devices using at least two different wavelengths.

14. Apparatus for a wavelength division multiplexing access network comprising:
   at least one operator device comprising a transmitter configured to transmit data to at least one user device via at least one wavelength of the wavelength division multiplexing access network;
   a monitoring device configured to optically monitor a plurality of wavelengths of the wavelength division multiplexing access network to determine at least one available wavelength that is free for use; and
   a controller arranged to configure the transmitter to transmit data to the at least one user device via at least one of the determined available wavelengths,
   wherein the monitored wavelengths relate to a plurality of operator devices,
   wherein the available wavelength is a wavelength that is not in use by any of the plurality of operator devices, and
   wherein each of the plurality of operator devices is
      arranged to provide a plurality of the wavelengths,
      arrange to monitor available wavelengths independently of the others of the plurality of other operator devices, and
      is associated with a different communication service provider or operator.

15. Apparatus according to claim 14,
   wherein the monitoring device is arranged to determine at least two available wavelengths that are free for use, and
   wherein the controller is arranged to configure at least one other operator device to transmit data to at least one user device via a different wavelength of the determined available wavelengths.

16. Apparatus according to claim 14,
   wherein the transmitter is a tuneable transmitter, and
   wherein the controller is arranged to configure the transmitter by tuning a wavelength of the transmitter to at least one of the determined available wavelength.

17. Apparatus according to claim 14, wherein the monitoring device is arranged to monitor at least one wavelength at a coupling device to determine the at least one available wavelength.

18. Apparatus according to claim 14, further comprising at least one wavelength selective switch arranged to receive data from the at least one user device,
   wherein the controller is arranged to configure the wavelength selective switch to transmit the data to the operator device via at least one of the determined available wavelength.

19. Apparatus according to claim 14, wherein the monitoring device comprises a power monitoring unit arranged to monitor a power of at least one wavelength.

20. Apparatus according to claim 14, wherein each operator device comprises a respective monitoring device arranged to monitor the plurality of wavelengths.

21. Apparatus according to claim 14, wherein the monitoring device is arranged to determine a plurality of available wavelengths that are free for use.

22. Apparatus according to claim 21, wherein the controller is arranged to configure at least one operator device to transmit data to the at least one user device via a subset of the determined plurality of available wavelengths.

23. Apparatus according to claim 14,
wherein the at least one operator device optically is arranged to optically receive service data from a service provider associated with the at least one operator device, and
wherein the controller is arranged to configure the transmitter to modulate the determined least one available wavelength with the service data.

24. Apparatus according to claim 14, wherein the controller is arranged to configure the transmitter to concurrently transmit data to at least two user devices using at least two different wavelengths.

25. Apparatus for a wavelength division multiplexing access network, comprising:
a controller comprising an input arranged to receive an information signal based on optical monitoring of a plurality of wavelengths and indicative of at least one available wavelength of the wavelength division multiplexing access network that is free for use; and
at least one transmitter to transmit data via at least one wavelength of the wavelength division multiplexing access network,
wherein the controller is arranged to control the transmitter to transmit data at the at least one available wavelength in response to the information signal,
wherein the monitored wavelengths relate to a plurality of operator devices, each of the plurality of operator devices providing a plurality of the wavelengths,
wherein the available wavelength is a wavelength that is not in use by any of the plurality of operator devices, and
wherein the controller is configured to monitor available wavelengths independently of the others of the plurality of other operator devices, each of the plurality of other operator devices being associated with a different communication service provider or operator.

26. The apparatus according to claim 25, comprising a monitoring device to monitor a plurality of wavelengths of the wavelength division multiplexing access network to determine the at least one available wavelength, and to generate the information signal.

27. The apparatus according to claim 25, wherein the transmitter is optically integrated as a complementary metal oxide semiconductor integrated circuit.

28. Apparatus according to claim 25, further comprising:
at least one optical link arranged to optically receive service data from a service provider associated with the apparatus, and
wherein the controller is arranged to configure the transmitter to modulate the determined least one available wavelength with the service data.

29. Apparatus according to claim 25, wherein the controller is arranged to configure the transmitter to concurrently transmit data to at least two user devices using at least two different wavelengths.

* * * * *